US010858542B2

(12) United States Patent
Hood

(10) Patent No.: US 10,858,542 B2
(45) Date of Patent: Dec. 8, 2020

(54) RESIN REMOVAL SYSTEMS

(71) Applicant: Supernova Tek LLC, Hood River, OR (US)

(72) Inventor: Bree A. Hood, Hood River, OR (US)

(73) Assignee: Supernova Tek LLC, Hood River, OR (US)

( * ) Notice: Subject to any disclaimer, the term of this patent is extended or adjusted under 35 U.S.C. 154(b) by 36 days.

(21) Appl. No.: 16/263,783

(22) Filed: Jan. 31, 2019

(65) Prior Publication Data

US 2020/0248032 A1 Aug. 6, 2020

(51) Int. Cl.
*C09F 1/02* (2006.01)
*B01D 11/02* (2006.01)
*B08B 3/14* (2006.01)

(52) U.S. Cl.
CPC ............ *C09F 1/02* (2013.01); *B01D 11/0249* (2013.01); *B08B 3/14* (2013.01)

(58) Field of Classification Search
CPC .......... C09F 1/02; B01D 11/0249; B08B 3/14
USPC .. 210/335, 314, 336, 167.01, 167.3, 167.31, 210/167.32, 171, 172.2, 175, 181, 194, 210/195.1, 195.3, 197, 201–203, 205, 210/206, 252, 255, 257.1, 260–262, 488, 210/489, 465–465
See application file for complete search history.

(56) References Cited

U.S. PATENT DOCUMENTS

| 4,659,463 A * | 4/1987 | Chandler ................ C02F 1/004 210/202 |
| 2005/0205487 A1* | 9/2005 | Rogers .................... A47J 36/08 210/464 |

\* cited by examiner

*Primary Examiner* — Madeline Gonzalez
(74) *Attorney, Agent, or Firm* — Miller IP Law, LLC

(57) ABSTRACT

A method, system, apparatus, and/or device for removing resin from material. The method, system, apparatus, and/or device may include a washer configured to receive water from a water source and air from an air source into an interior cavity of the washer via an inlet, the washer including a first filter located within the interior cavity, where the interior cavity is configured to store a material, the interior cavity is configured to direct a flow of the water and the air in a defined pattern to remove a resin from the material, and the washer comprises an opening covered by the first filter. The first filter may be configured to allow the water, the air, and the resin to exit the opening while restricting the material from exiting the opening.

20 Claims, 5 Drawing Sheets

RESIN REMOVAL SYSTEMS

BACKGROUND

Botanicals are substances obtained or derived from natural materials and/or organic materials. For example, the natural materials or organic materials may be plants or parts of plants. In another example, the natural materials or organic materials may denote groups of native substances which are obtainable from organic or inorganic material. For example, the botanicals may be hydrocarbons (such as terpenes and the oxygenated compounds), cannabidiols (CBD), tetrahydrocannabinols (THC), essential oils, and so forth. Many botanicals have applications in the food industry, the tobacco industry, the perfume industry, and the pharmaceutical industry. For example, botanicals are widely used as ingredients for fragrances, flavoring mixtures, and medicinal remedies. To put the botanicals in a usable form, the botanicals must be extracted from the natural materials or the organic materials.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

DETAILED DESCRIPTION

Figure 1:
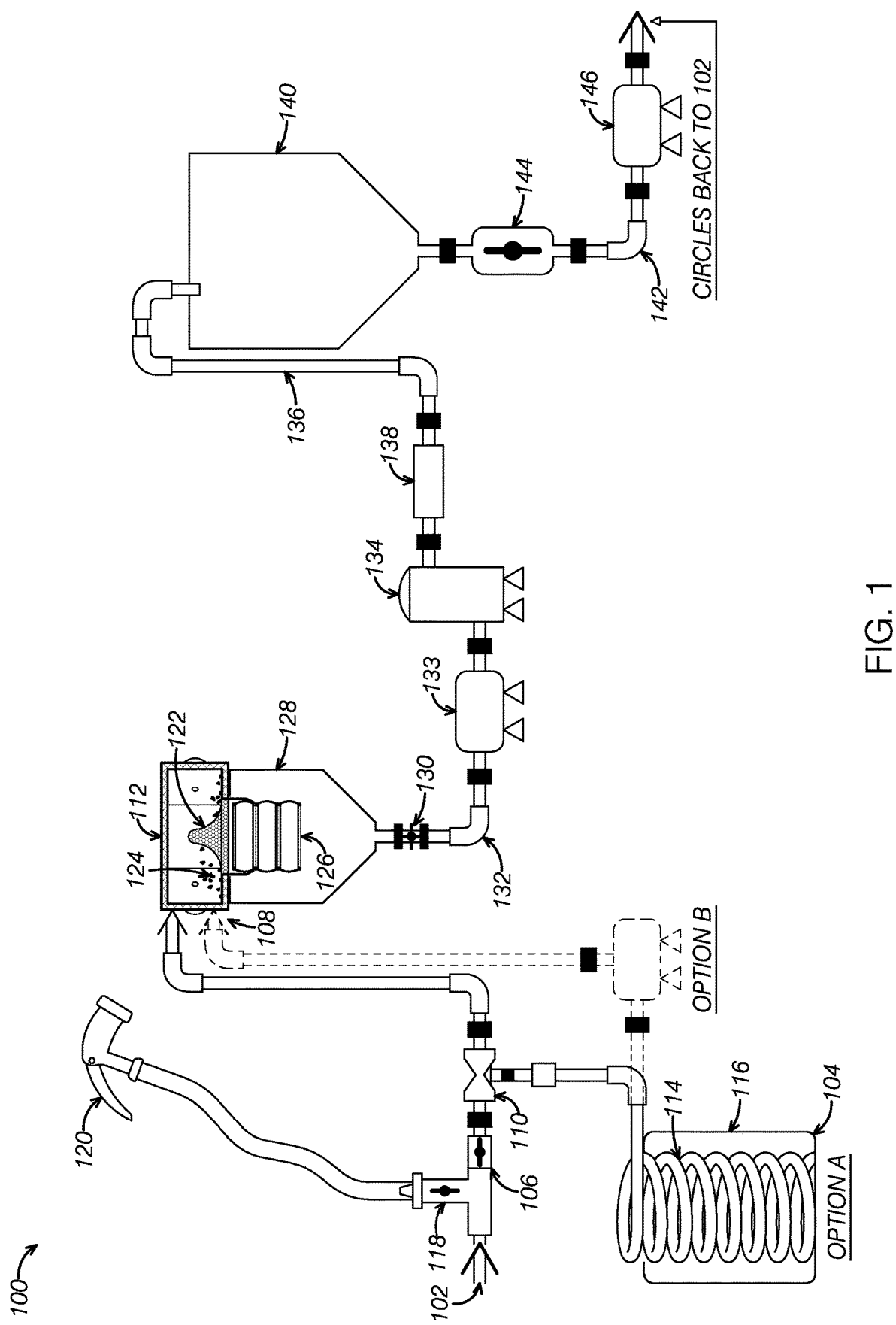
FIG. 1 illustrates a resin removal system to remove resin from a material, according to an embodiment.

The disclosed resin removal systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of resin removal system examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Botanicals are substances obtained or derived from natural materials and/or organic materials, such as plants, parts of plants, or native substances which are obtainable from organic or inorganic material. For example, the botanicals may be hydrocarbons, cannabidiols (CBD), tetrahydrocannabinols (THC), essential oils, and so forth that may be used in the food industry, the tobacco industry, the perfume industry, and the pharmaceutical industry for fragrances, flavoring mixtures, and medicinal remedies.

To put the botanicals in a usable form, the botanicals are extracted from the natural materials and/or organic materials. Conventionally, to remove the botanicals from the natural material or the organic material an individual may use an ice water extraction also known as a bubble hash extraction. The ice water extraction may separate cannabinoids and trichomes from plant material which combined create a cannabis resin by using ice, water, and a screen to strain out resin glands which are inherently more dense than water. For example, a ice water hash machine may include a washing machine with a vertical or horizontal drum and plant matter and ice in a screen bag. The screen bag may be placed in the drum with the ice and water, then tumbled for a defined amount of time and using a motor to spin the washing machine drum before the liquid is drained through a tube into a bucket which contains bags that further separate particulates and resin.

While the bubble hash extraction may separate the particulates and the resin from the plant material, the the bubble hash extraction may be extremely labor intensive and may be limited in scalability. For example, there may be physical limits as to the size that the vertical or horizontal drum of the washing machine may be scaled to due to natural laws of physics. The physical limits of the size the drum may be scaled to may limit the ability to use the bubble hash extraction for mass production. Additionally, the conventional bubble hash extraction may require a relatively long amount of time to perform and may be time intensive, where the process may require multiple runs to fully extract resin from the material. Furthermore, the conventional bubble hash extraction may not be automated as it requires manual labor to perform the process. The conventional bubble hash extraction may also use a relatively large amount of water and electricity, making the process not eco-friendly and costly.

Implementations of the disclosure address the above-mentioned deficiencies and other deficiencies by providing methods, systems, devices, and/or apparatuses to extract botanicals from natural materials and/or organic materials. The resin removal system may include a water source, an air source, a washer, a filter, and a processing tank. In one embodiment, a material may be inserted into the washer. Once the material is inserted into the washer, the water may be received from the water source and air may be received from the air source into the washer. As the water and the air are received into the washer, the water and the air may be circulated in the washer in a specific motion to remove the resins from the material as the water and the air are circulated with the material from the washer to the filter. The filter may allow the water and the air to pass through to the processing tank while collecting the resins in the filter.

The filter with the resins may be disconnected from the washer and the resins may be removed for subsequent use. An advantage of the resin removal system may be that the resin removal system may be scaled up or down based on the desired use of the system, such as personal use or business use. Another advantage of the resin removal system may be to minimize the physical forces applied to the material to remove the resin, which may reduce the particularization and damage to the material. Another advantage of the resin removal system may be to reduce the time and labor required to extract resin from the material. Another advantage of the resin removal system may be to enable a user to automate the resin removal process and reduce or eliminate the amount of physical labor required to remove the resin from the material.

FIG. 1 illustrates a resin removal system 100 to remove resin from a material 124, according to an embodiment. In one embodiment, the resin removal system 100 may include a water source 102 and an air source 104 connected to a washer 112. In one embodiment, the water source 102 may be connected to the washer 112 by a first conduit 106, such as a first pipe, a first duct, or a first tube. In another embodiment, the air source 104 may be connected to the washer 112 by a second conduit 108, such as a second pipe, a second duct, or a second tube. As discussed below, the first conduit 106 and the second conduit 108 may be connected to a manifold of the washer 112. As the water and the air are received at the washer 112, the water and/or the air may be mixed by the washer 112 to generate a water pattern to remove resins from a material 124. The material 124 may be seeds, tubers, vegetables, fruits, cannabis, flowers, and so forth.

In another embodiment, the second conduit 108 may be connected to the first conduit 106 via a connector 110. In one example, the connector 110 may be a venturi valve that creates a constriction within the first conduit 106 (such as an hourglass shape) that varies the flow characteristics of water traveling through the first conduit 106. As the water velocity in the throat of the venturi valve increases, the increase in velocity may create a natural pump or suction that may pull the air from the air source 104 and combine the air with the water. In another embodiment, the connector 110 may be a one-way valve, a globe valve, a gate valve, a ball valve, a butterfly valve, a diaphragm valve, a check valve, and so forth. In another embodiment, the water from the water source 102 may be pressurized by a first pump so that the water may be pressurized and directed from the water source 102 (via the first conduit 106) to the washer 112.

The water source 102 may be a tank or container to store water and/or liquid. In one example, the water source 102 may be a 100-gallon to 300-gallon tank to store water and/or other liquids. In another example, the tank or container may store the water and/or other liquids at a cold or near freezing temperature, such as between 33 degrees Fahrenheit to 45 degrees Fahrenheit. In another example, the tank or container may store the water and/or other liquids at a heated temperature, such as between 75 degrees Fahrenheit and 120 degrees Fahrenheit. In another example, the water may include chemicals mixed in with the water. For example, to remove certain types of resins from materials, chemicals may also be required to remove the resin and those chemicals may be added to the water at the tank or container. In another example, the chemicals may be added in line with conduits for water or air or as a separate conduit connected to the washer 112. In one embodiment, the washer 112 may be a metal material, a plastic material, a rubber material, a polyurethane material, a composite material, a foam material, and so forth. For example, the washer 112 may include a metal interior with a fiber composite housing to enclose a torus washer or toroidal washer, as discussed below. In another example, the interior of the torus washer or toroidal wash may include an interior with a stiff foam with food-grade coating and a housing that is a wood material or a plastic material. The washer 112 may be a material which can withstand high pressure, relatively hot and/or cold temperatures, and may have interior surfaces that are food grade surfaces.

In another embodiment, the air from the air source 104 may be pressurized by a second pump so that the air may be pressurized and directed from the air source 104 (via the second conduit 108) to the washer 112. In another embodiment, the air from the air source 104 may be pressurized by a second pump so that the air may be pressurized and directed from the air source 104 (via the second conduit 108, the connector 110, and the first conduit 106) to the washer 112.

In another embodiment, the air may be cooled at the air source 104 prior to providing the air to the washer 112. In one example, the air source 104 may be air that is taken in or received from an area approximate a tube 114. The tube 114 may be a coil that is within a container 116 that cools the coil to a defined temperature level. In one example, the tube 114 may be refrigerated. In another example, at least a portion of the tube 114 may be surround by a cold material, such as ice or a cooling gel. As the air is in taken by the cooled tube 114, the temperature of the air may be cooled by the cooled tube 114 to decrease the temperature of the air below a threshold temperature level. In one embodiment, the threshold temperature level may be below 32 degrees)(° Fahrenheit (F) or 0° Celsius (C). In another embodiment, the threshold temperature level may be below 0° F. or −18° C. In another embodiment, the water from the water source 102 may be cooled to a threshold temperature. For example, the water may be cooled at the water source 102 by a refrigeration unit, a tube, and container similar to the tube 114 and the container 116. In another example, the water may be cooled by ice added to the water at the water source.

In another embodiment, the air from the air source 104 may be heated. For example, to heat the air, the air source 104 may include a forced air heater that may heat the air at the air source 104 or heat the air prior to the air being stored or sucked in by the air source 104. In another example, the air source 104 may include the tube 114 where the air is stored and the tube 114 may be heated by a heating element to increase the temperature of the air. In another embodiment, the tube 114 may be copper because the copper tubing may transmute the cold or hot temperatures of the air. In another embodiment, the cold air or the heated air, when introduced into the washer 112, may aid to quickly and efficiently separate and expose all sides of the material 124 in the chamber to extract the resin from the material 124.

In another embodiment, the first conduit 106 or the second conduit 108 may include a check valve 118 and a sprayer 120 that may be used to clean the resin removal system 100. For example, when the check valve 118 is partially or fully opened, at least a portion of the water from the water source 102 may be diverted from the first conduit 106 or the second conduit 108 to the sprayer 120. The sprayer 120 may then spray the water onto a part or all of the resin removal system 100 such as the water source 102, the air source 104, the washer 112, a processing tank 128, a filter 134, a recycled water tank 140, and so forth. In another embodiment, to clean part or all of the resin removal system 100, air may be run through the resin removal system 100. For example, to clean plant material in the resin removal system 100, room temp air or heated air may be run through the resin removal system 100 to dry the resin removal system 100. Once the resin removal system 100 has been dried, the material 124 that the resin was extracted from may be removed from the resin removal system 100. In another example, room temperature or heated air may be run through the resin removal system 100 to screen rocks out of dirt and debris and/or to mix natural ingredients and compost into soil to produce organic planting soil.

As the washer 112 receives the water and the air, the washer 112 may direct the water and the air to a material 124 held within the washer 112 to remove resins from the material 124. As discussed below, the water and the air may be directed to form a defined pattern within the washer 112 to remove the resins from the material 124. The resins may include hydrocarbons (such as terpenes and the oxygenated compounds), cannabidiols (CBD), tetrahydrocannabinols (THC), essential oils, and so forth.

As discussed below, the water and/or the air may be injected or sprayed into the washer 112 in a directional flow to create a centrifugal or toroidal pattern that in turn generates a chaotic movement in the washer 112 to wash and clean the material 124 (such as cannabis, seeds, tubers, or other vegetables and fruits) and remove the resin from the material 124. When the material 124 is seeds, the resin extracting process may separate and clean the seeds and then carry the seeds through the first filter 122 to the second filter 126 and separate the seeds via the sub-filters as discussed below.

In one example, the washer 112 may include a housing with a first filter 122. In one example, the washer 112 may include an opening in the bottom of the housing that the first filter 122 may be inserted into. To insert the material 124 into the washer 112, the washer 112 may be detached and removed from the processing tank 128 and the material 124 may be inserted into an area enclosed by the first filter 122. In one embodiment, the material 124 is loaded and unloaded in the washer 112 by disconnecting or removing the washer 112 from the processing tank 128 and then removing the first filter 122 from within the washer 112. In one example, the washer 112 may be approximate to or rest on the processing tank 128 such that the washer 112 may be lifted off the processing tank 128 to disconnect the washer 112 from the processing tank 128. In another example, the washer 112 may twist lock onto the processing tank 128 such that the washer 112 may be rotated clockwise to unlock the washer 112 from the processing tank 128 and rotated counterclockwise to lock the washer 112 to the processing tank 128, or vise versa. In another example, the first filter 122 may twist lock into the opening of the washer 112. As the water and the air are received into the washer 112, the water and the air may be directed into the first filter 122 to remove the resins from the material 124.

In one example, the water and the air may be directed by the housing of the washer 112 toward the first filter 122 and the material 124 stored within the washer 112. The water and the air may then be directed out the opening in the bottom of the housing of the washer 112, and toward the processing tank 128. As the water and/or the air are directed to the processing tank 128, the force of the water and the air against the material 124 as the water and/or the air exit the opening in the washer 112 may wash or remove the resins from the material 124 and direct the resins toward the processing tank 128. The processing tank 128 may be a plastic material, a metal material, a rubber material, a polyurethane material, and so forth.

In one embodiment, the processing tank 128 may include a second filter 126 attached to a top of the processing tank 128. As the water and/or the air exit the washer 112 and enter the processing tank 128, the water and the air may pass through the second filter 126. The second filter 126 may be porous to allow the water and the air to pass through the second filter 126 while the second filter 126 may remove the resins from the water and/or the air and trap or hold the resins within the second filter 126. In one example, the water and/or the air may be stored in a housing of the processing tank 128 and the resins from the material 124 may be stored within the second filter 126. A user of the resin removal system 100 may desire to use the resins removed from the material 124 for various purposes. For example, the resin removed from the material 124 may be hydrocarbons (such as terpenes and the oxygenated compounds), cannabidiols (CBD), tetrahydrocannabinols (THC), essential oils, and so forth. To remove the resin from the second filter 126, the user may detach the washer 112 from above the processing tank 128 and then remove the second filter 126 from the processing tank 128. Once the second filter 126 is removed from the processing tank 128, the user may wash, scrape, skim, or otherwise extract the resin from the second filter 126.

In one embodiment, the water stored in the processing tank 128 may be discarded via an opening at the bottom of the processing tank 128. For example, the opening at the bottom of the processing tank 128 may allow the water to flow onto the ground or the floor. In another example, the bottom of the processing tank 128 may be connected to a drain or a sewage connection to get rid of the water.

In another embodiment, the resin removal system 100 may include a recycling system to clean and recycle the water from the processing tank 128 so that the water may be reused. When the resin removal system 100 uses recycled water, the resin removal system 100 may be a closed system that does not require new water to remove the resin from the material 124. To recycle the water in the processing tank 128, the opening at the bottom of the processing tank 128 may be connected to a third conduit 132. In one embodiment, the third conduit 132 may be connected directly to the bottom of the processing tank 128. In another embodiment, a check valve 130 may be connected to the bottom of the processing tank 128 and the third conduit 132 may be connected to the check valve 130. The check valve 130 may allow a user to control when the water stored in the processing tank 128 is released. The third conduit 132 may be connected to a filter 134. The filter 134 may remove particles or material from the water to clean the water for subsequent use. In one example, the water may be gravity fed to the filter 134, where the processing tank 128 may be located at an elevation above the filter 134 to create natural pressure to force the water through the filter 134. In another embodiment, the third conduit 132 may include a pump 133, such as an inline pump, that may suck or pull the water from the processing tank 128 and direct the water through the filter 134.

In one embodiment, when the water has passed through the filter 134, the water may be directed back to the first conduit 106. In another embodiment, when the water has passed through the filter 134, the water may be directed through a fourth conduit 136 to a water tank 140. In one example, the water tank 140 may be used to store the recycled water. In one example, a pump may be connected to the water tank 140 such that when the pump is turned on, the pump may send the water stored in the water tank 140 through the resin removal system 100 several times before the water is to be heated or cooled again.

In another example, the water tank 140 may store fresh water that is poured into the water tank 140 through an opening in the water tank 140 or through another conduit connected to the water tank 140. In another embodiment, the fourth conduit 136 may include a valve 138, such as an inline check valve, that may control when the water may flow from the filter 134, through the fourth conduit 136, to the water tank 140. A fifth conduit 142 may be connected to the water tank 140, such as at the bottom of the water tank 140.

In one embodiment, the fourth conduit 136 may convey the water in the water tank 140 to the water source 102. In another embodiment, the water tank 140 may be the water source 102, where the fifth conduit 142 is connected to the first conduit 106 such that the water in the water tank 140 may be conveyed to the washer 112 via the fifth conduit 142 and the first conduit 106. The connection of the first conduit 106 and the fifth conduit 142 may form the closed loop system of the resin removal system 100. In one example, the fifth conduit 142 may include a valve 144, such as a ball valve or a check valve, to control when and how much water may flow out of the water tank 140 via the fifth conduit 142. In addition to controlling the flow of the water and/or the air in the resin removal system 100, the valves discussed herein for the resin removal system 100 may allow for replacement and/or cleaning of clogged areas of the resin removal system 100 without disrupting the entire water supply.

In another example, the fifth conduit 142 may include a pump 146, such as an inline pump, to suck the water from the water tank 140 and provide the water to the water source 102 or the first conduit 106. In addition to controlling the flow and pressurizing the water and/or the air in the resin removal system 100, the pumps discussed herein for the resin removal system 100 may allow for automating the resin removal system 100 with timers where the water and/or the air may automatically be provided to the resin removal system 100 at defined times of the day and/or for defined periods of time.

Figure 2A:
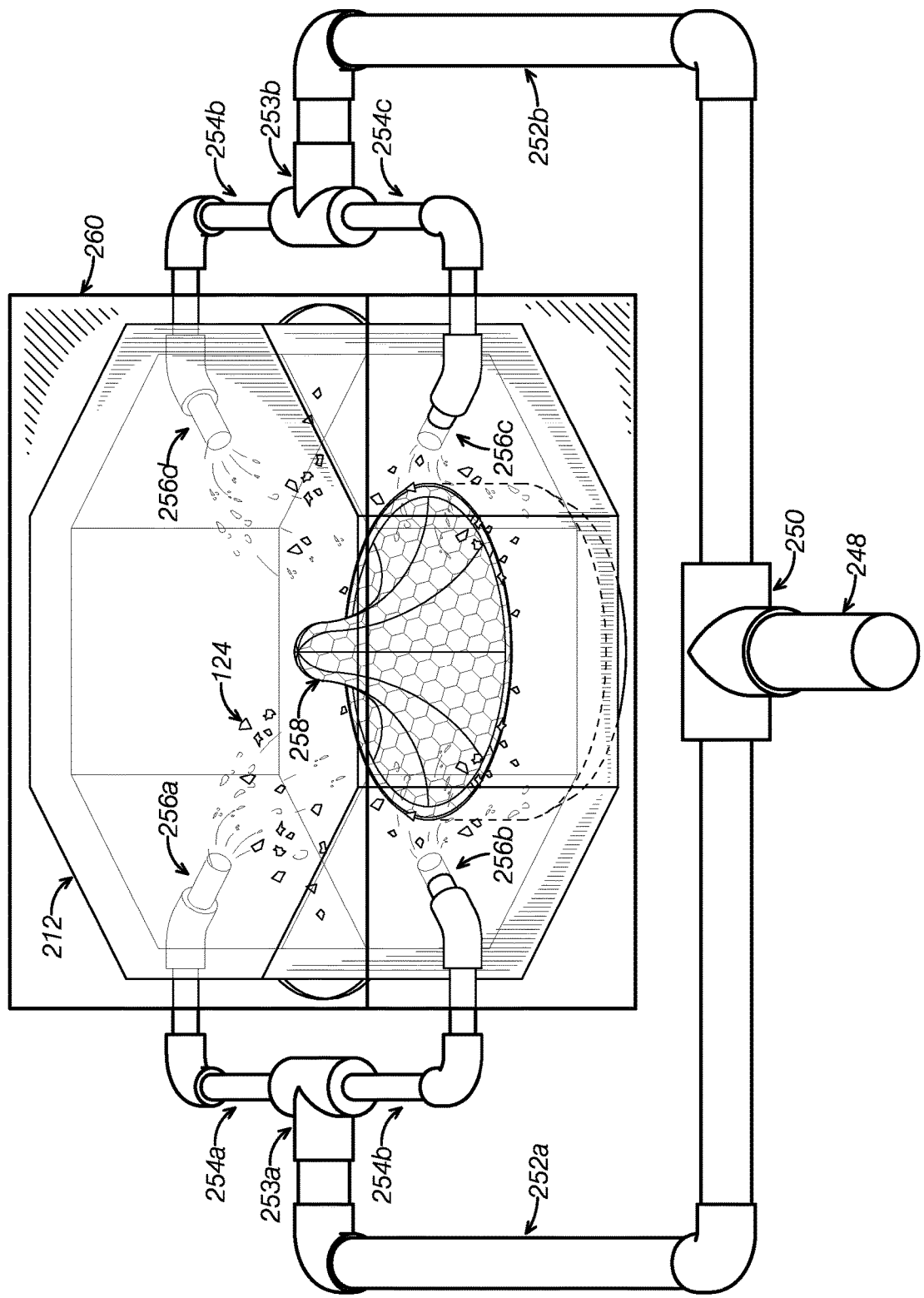
FIG. 2A illustrates a top perspective view of a torus washer with an octagonal shape, according to an embodiment.

FIG. 2A illustrates a top perspective view of a torus washer 212 with an octagonal shape, according to an embodiment. As discussed above, the resin removal system 100 in FIG. 1 may include a washer 112 to remove resin from material 124. In one example, the washer 112 in FIG. 1 may be the torus washer 212 in FIG. 2A. In one embodiment, the torus washer 212 may receive water and/or air from a source 248.

In one example, the source 248 may be the first conduit 106 and/or the second conduit 108. In one embodiment, the torus washer 212 may receive the water and/or the air from the source 248 via a manifold structure. In one example, the manifold structure may receive the water and/or the air via a single inlet (such as one of 256a-256d) connected to the source 248. In another example, the manifold structure may receive the water and/or the air via multiple inlets 256a-256d. In one example, the inlets 256a-256d may be plates or slots that direct low pressure or high-pressure water and/or air at a defined angle and/or direction. In one embodiment, the plates may be relatively stiff and/or rigid material (such as metal or plastic). In another embodiment, the plates may be a food grade material or a material coated with a food grade coating. The plates may include holes angled at a 45-degree angle to spray water into the torus washer 212. The angle, size, and/or direction of the slots or holes of the inlets 256a-256d may generate the water and/or the air flow patterns as discussed herein.

To receive the water and/or the air through the multiple inlets 256a-256d, the manifold structure may include dividing the water and/or the air into multiple conduits. For example, when the manifold structure includes 4 inlets 256a-256d at the torus washer 212, the manifold structure may include a T-junction 250 to divide the water and/or the air from the source 248 so that a first portion of the water and/or the air flows into a first conduit 252a and a second portion of the water and/or the air flows into a second conduit 252b. The first conduit 252a may be connected to a second T-junction 253a to divide the water and/or the air in the first conduit 252a into a first portion that follows into a third conduit 254a and a fourth conduit 254b. The third conduit 254a may be connected to the first inlet 256a of the torus washer 212 and the fourth conduit 254b may be connected to the second inlet 256b of the torus washer 212.

The second conduit 252b may be connected to a third T-junction 253b to divide the water and/or the air in the second conduit 252b into a first portion that follows into a fifth conduit 254c and a sixth conduit 254d. The fifth conduit 254c may be connected to the third inlet 256c of the torus washer 212 and the sixth conduit 254d may be connected to the fourth inlet 256d of the torus washer 212. The number of inlets into the torus washer 212 and/or the manifold structure is not intended to be limiting and may vary. For example, the torus washer 212 may have two inlets on opposite sides of the torus washer 212 or inlets on each side of the torus washer 212 based on the desired amount of water and/or air a user may want to use to remove resin from the material, the type of material from which resin is removed, the size of the torus washer 212, and so forth.

In one embodiment, the torus washer 212 may be enclosed by a housing 260. In one embodiment, the housing 260 may include handles to enable a user to more easily pick up the torus washer 212. In another embodiment, the housing 260 may provide a protective cover to protect the torus washer from damage. The torus washer 212 may include a filter or screen 258 at approximately the center of the torus washer 212. For example, at the center of the interior of the torus washer 212 may include a first filter 258 that is a barrel-shaped metal screen which extends 5-8 inches into the interior of the torus washer 212 and sits flush with the bottom of the torus washer 212. As discussed above, the filter 258 may be secured to a housing of the torus washer 212 by a fastener or with a locking mechanism, such as a twist and lock mechanism. The filter 258 may allow liquids and particles smaller than the screen size to flow downward using gravity, into the processing tank 128 while keeping larger pieces inside the chamber for cleaning or disposal. In one example, the filter 258 may be a material so that the filter 258 may keep its shape in the face of the directional liquid and air flows. In one embodiment, the material may be a semi-rigid material such a metal.

In one embodiment, as the torus washer 212 receives the water and/or the air from the inlets 256a-256d, the water and/or the air may circulate around an interior cavity of the torus washer 212 in a defined pattern, such as a circular pattern, a torus pattern, or a centrifugal pattern. The defined pattern may indicate a directional flow of the water and/or the air. As the water and/or the air circulates around the cavity in the defined pattern, the water and/or the air may chaotically or randomly move the material within the cavity of the torus washer 212. The circular or torus pattern of the water and/or the air along with the chaotic or random movement of the material may dislodge or remove the resin from the material.

As the water, the air, and the material circulate about the torus washer 212, the water, the air, and the material may be pulled toward an opening at the bottom of the torus washer 212 below the filter 258. As the water and/or the air exit through the opening, the resin that has been removed from the material may exit with the water and/or the air as the filter 258 restricts the material from exiting through the opening.

Figure 2B:
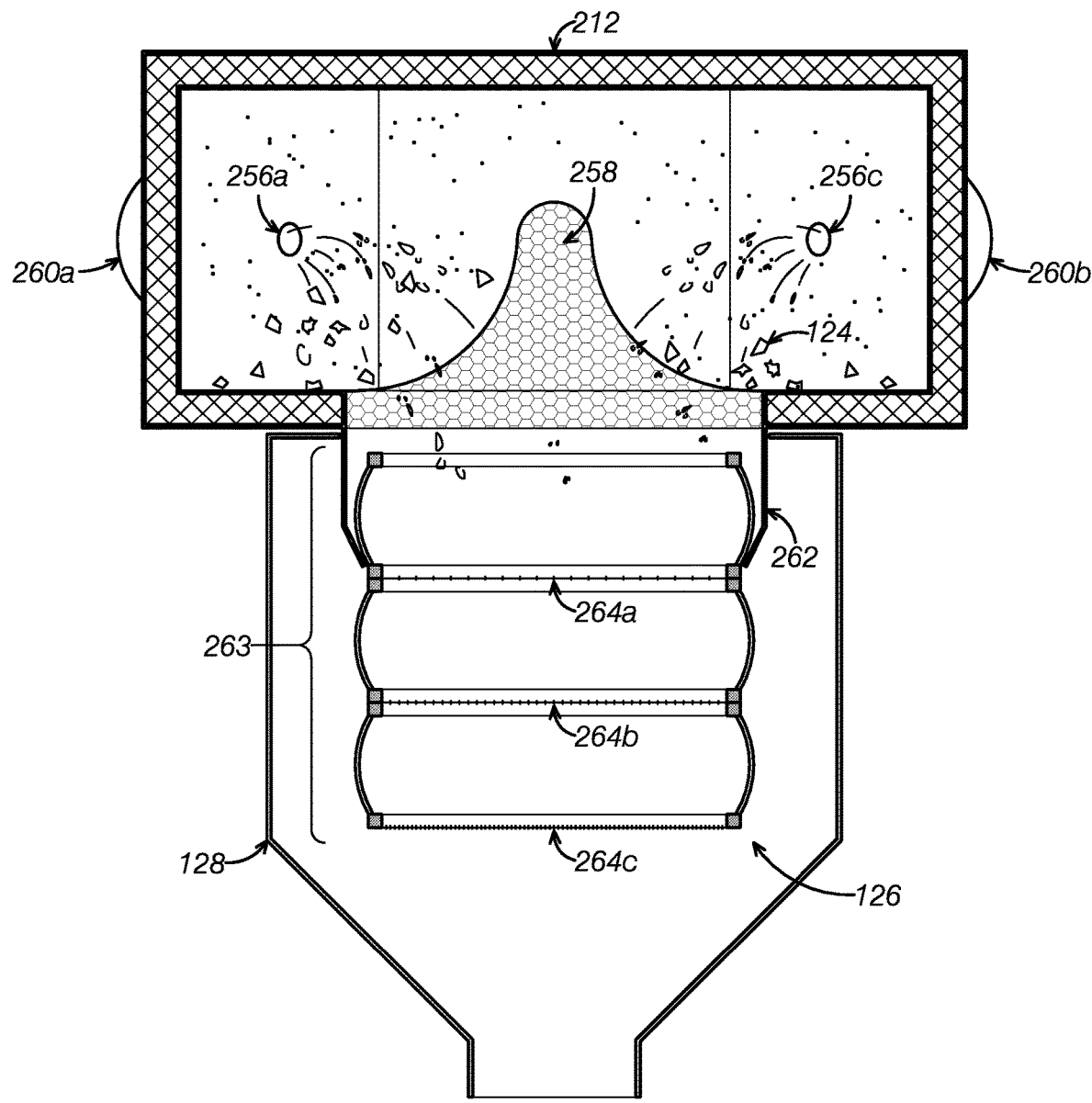
FIG. 2B illustrates a side exposed view of the torus washer and the second filter, according to an embodiment.

FIG. 2B illustrates a side exposed view of the torus washer 212 and the second filter 126, according to an embodiment. Some of the features in FIG. 2B are the same or similar to some of the features in FIGS. 1 and 2A as noted by same reference numbers, unless expressly described otherwise. As discussed above, the resin removal system 100 in FIG. 1 may include a washer 112 to remove resin from material 124. As further discussed, as the water and/or the air may circulate around the cavity of the torus washer 212 in the defined pattern, the water and/or the air may also chaotically or randomly move the material within the cavity of the torus washer 212 to dislodge or remove the resin from the material. As the water, the air, and the material circulate about the torus washer 212, the water, air, and material may be pulled toward an opening at the bottom of the torus washer below the filter 258.

In one example, the processing tank 128 may be located approximate to the torus washer 212 to receive the water, the air, and resin from the material from the torus washer 212. In another example, the torus washer 212 may rest on top of the processing tank 128 with fasteners 262 that may extend from the bottom of the torus washer 212 to align the opening at the bottom of the torus washer 212 with an opening at the top of the second filter 126. In one example, the torus washer 212 and the second filter 126 may interlock or interconnect. In another example, the torus washer 212 may freely sit on top of the processing tank 128 with the opening at the bottom of the torus washer 212 being aligned with the opening at the top of the second filter 126 when the fasteners 262 of the torus washer 212 are inserted into the top of the processing tank 128.

When the torus washer 212 is connected or aligned with the second filter 126, the water, the air, and the resin, may flow out of the opening at the bottom of the torus washer 212 and into the second filter 126. As the water, the air, and the resin flow through the second filter 126, the resin may be caught or trapped by the second filter 126 while the water and/or the air pass through the second filter 126 to be stored in the processing tank 128. In one embodiment, the second filter 126 may include multiple sub-filters that may catch or trap different portions of the resin with different particulate sizes by having different mesh sizes or mesh numbers for the sub-filters. In one embodiment, the sub-filters may be attached to a basket or tower structure 263 where the sub-filters are vertically stacked at defined distances along the basket or tower structure 263 and connected to the basket or tower structure 263 along the perimeter of the sub-filters and the basket or tower structure 263. The basket or tower structure 263 may be connected to the processing tank 128 and the basket or tower structure 263 may hang directly below a bottom opening of the torus washer 212, such as at a bottom center of the torus washer 212. In another embodiment, the basket or tower structure 263 may be stiff and light material (such as flexible metal or plastic) and the sub-filters may be a flexible material (such as perforated metal or nylon material). In another embodiment, the sub-filters may be fastened to the basket or tower structure 263 with a fastener (such as a latch, a clasp, and so forth).

For example, the filter 258 may include a filter to capture any materials larger than 177 microns and keep that material within the torus washer 212. In this example, the sub-filters may include a first sub-filter 264a may catch resin particulates with a first size (such as ranging between 176 microns to 145 microns) by having a first mesh size or a mesh number to catch the resin particulates with the first size, a second sub-filter 264b to catch resin particulates with a second size (such as ranging between 144 microns to 90 microns) by having a second mesh size or a mesh number to catch the resin particulates with the second size, and a third sub-filter 264c to catch resin particulates with a third size (such as ranging between 89 microns to 45 microns) by having a third mesh size or a mesh number to catch the resin particulates with the third size. In another example, the tower structure 263 may include a fourth sub-filter to catch resin particulates with a second size (such as ranging between 44 microns to 25 microns) by having a fourth mesh size or a mesh number to catch the resin particulates with the fourth size. The number of sub-filters, the mesh sizes, and particulate sizes is not intended to be limiting and may vary.

The sub-filters 264a-264c may be configured to catch the different particulate sizes in order to separate different grades of the particulates. For example, the particulates caught by the first sub-filter 264a may be the lowest grade of particulates, the particulates caught by the second sub-filter 264b may be a medium grade of particulates, and the particulates caught by the first sub-filter 264a may be the highest grade of particulates. For example, recreational cannabis stores may sell 3 star cannabis, 4 star cannabis, and 5 star cannabis, where the 3 star cannabis may include resin that may be approximately 176 microns to 125 microns in size, the 4 star cannabis include resin that may be approximately 124 microns to 45 microns in size, and 5 star cannabis may include resin that may be approximately 44 microns to 25 microns in size. The lower star or lower grade cannabis may be ranked lower because the cannabis includes less resin and more plant matter such that it includes less concentrated resin as compared to higher ranked cannabis. In another example, 3 star cannabis may be the lowest grade product sold in the recreational and medical markets and the 5 star cannabis may be the highest grade cannabis sold.

In one embodiment, to remove the resin from the sub-filters 264a-264c, the resin may be attached to or lay on top of the screens of the sub-filters 264a-264c. When the sub-filters 264a-264c are removed from the basket or tower structure 263, the resin may be removed and then used or stored for later use. In one example, once the resin has been removed from the sub-filters 264a-264c, the resin may be frozen for later separation, drying, and packaging. In another example, once the resin has been removed from the sub-filters 264a-264c, the resin may be prepared for drying and packaging.

The number of sub-filters and the mesh size or mesh number of each sub-filter may vary based on the degree that a user may desire to separate resin particulates of different sizes. For example, the second filter 126 may include a single sub-filter when the second filter 126 is configured not to separate out the different resin particulate sizes or the second filter 126 may include 10 sub-filters when the second filter 126 is configured to separate out the different resin particulate sized to a high level of granularity.

As discussed above, the torus washer 212 may be enclosed by a housing 260. In one embodiment, the housing 260 may include handles 260a and 260b to enable a user to more easily pick up the torus washer 212. The handles 260a and 260b may be located on opposite sides of the housing 260.

Figure 3A:
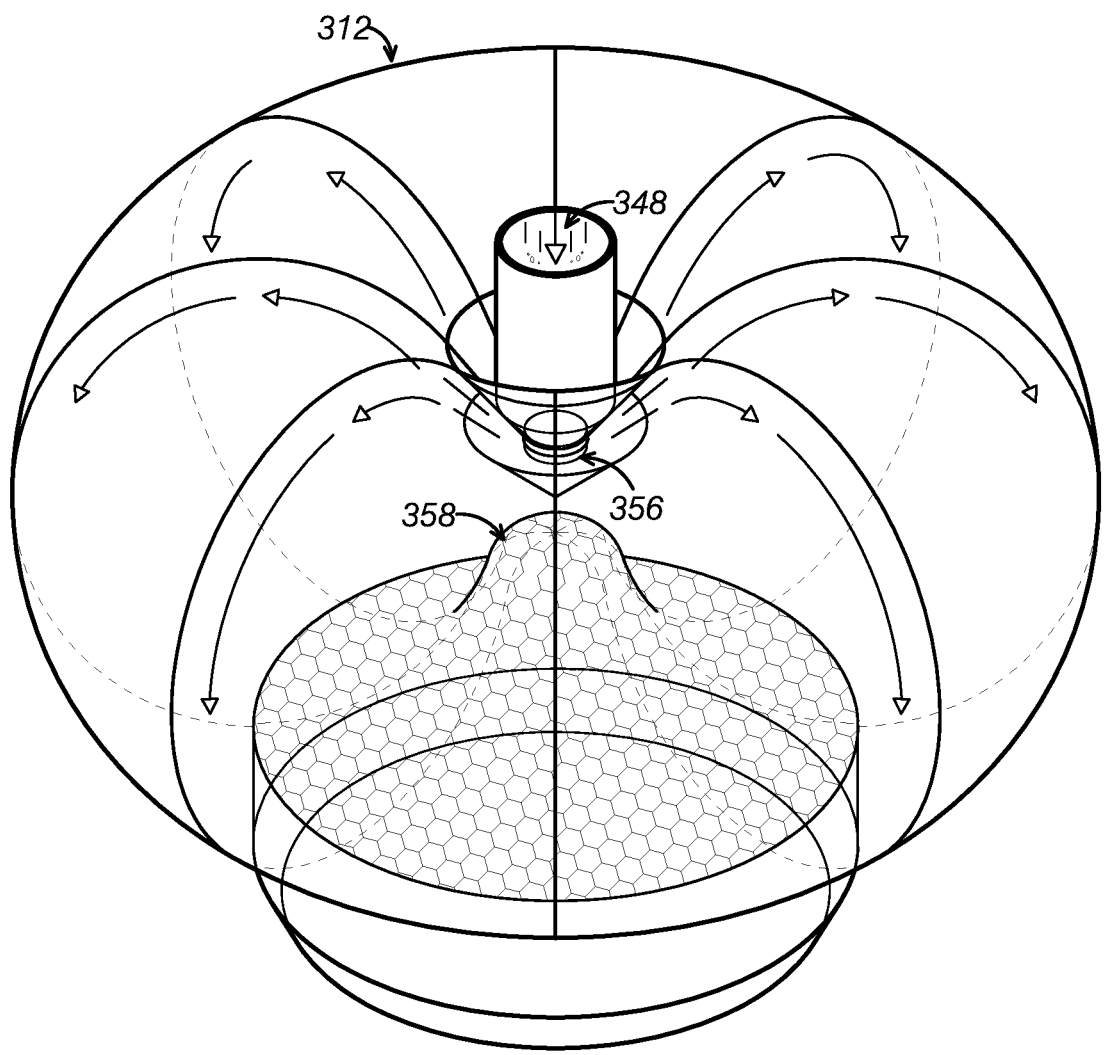
FIG. 3A illustrates a top perspective view of a toroidal washer with a donut shape, according to an embodiment.

FIG. 3A illustrates a top perspective view of a toroidal washer 312 with a donut shape, according to an embodiment. Some of the features in FIG. 3A are the same or similar to some of the features in FIGS. 1-2B as noted by same reference numbers, unless expressly described otherwise. As discussed above, the resin removal system 100 in FIG. 1 may include a washer 112 to remove resin from the material 124. In one example, the washer 112 in FIG. 1 may be the toroidal washer 312 in FIG. 3A. In one embodiment, the toroidal washer 312 may receive water and/or air from a source 348. In one example, the source 348 may be the first conduit 106 and/or the second conduit 108 in FIG. 1A.

In one embodiment, the toroidal washer 312 may receive the water and/or the air from the source 348 via an opening or inlet 356 at a top of the toroidal washer 312. In one example, the inlet 356 may be located at the top center of the toroidal washer 312. In another example, the source 348 may be a conduit fastened and sealed to the top of the toroidal washer 312 so that pressurized water and/or air may be sprayed into a cavity of the toroidal washer 312. In another example, the source 348 may be a conduit located above the top opening of the toroidal washer 312 where the water and/or the air may naturally flow into the top opening via gravity pulling the water down into the top opening. In another example, the toroidal washer 312 may have inlets that are the same or similar to the inlets 256a-256d (in FIG. 2A) integrated into the sides of the toroidal washer 312.

The toroidal washer 312 may include a filter or screen 358 at approximately the center of the toroidal washer 312. In one example, the filter 358 may be a barrel-shaped metal screen at the center of the toroidal washer 312 that may extend 5-8 inches into the interior of the toroidal washer 312 and may sit flush with a bottom of the toroidal washer 312. The filter 358 may be fastened to the bottom of the toroidal washer 312 or may be attached to a housing of the toroidal washer 312 with a locking mechanism, such as a twist and lock mechanism.

In one embodiment, as the toroidal washer 312 receives the water and/or the air from the inlet 356, the water and/or the air may circulate around a cavity of the toroidal washer 312 in a defined pattern, such as a spherical pattern or a toroidal pattern. As the water and/or the air circulates around the cavity in the defined pattern, the water and/or the air may also chaotically or randomly move the material within the cavity of the toroidal washer 312. The defined pattern of the water and/or the air along with the chaotic or random movement of the material may dislodge or remove the resin from the material 124. As the water, the air, and the material circulate about the toroidal washer 312, the water, air, and material may be pulled toward an opening at the bottom of the torus washer below the filter 358. As the water and/or the air exit through the opening, the resin that has been removed from the material may exit with the water and/or the air as the filter 358 restricts the material from exiting through the opening.

Figure 3B:
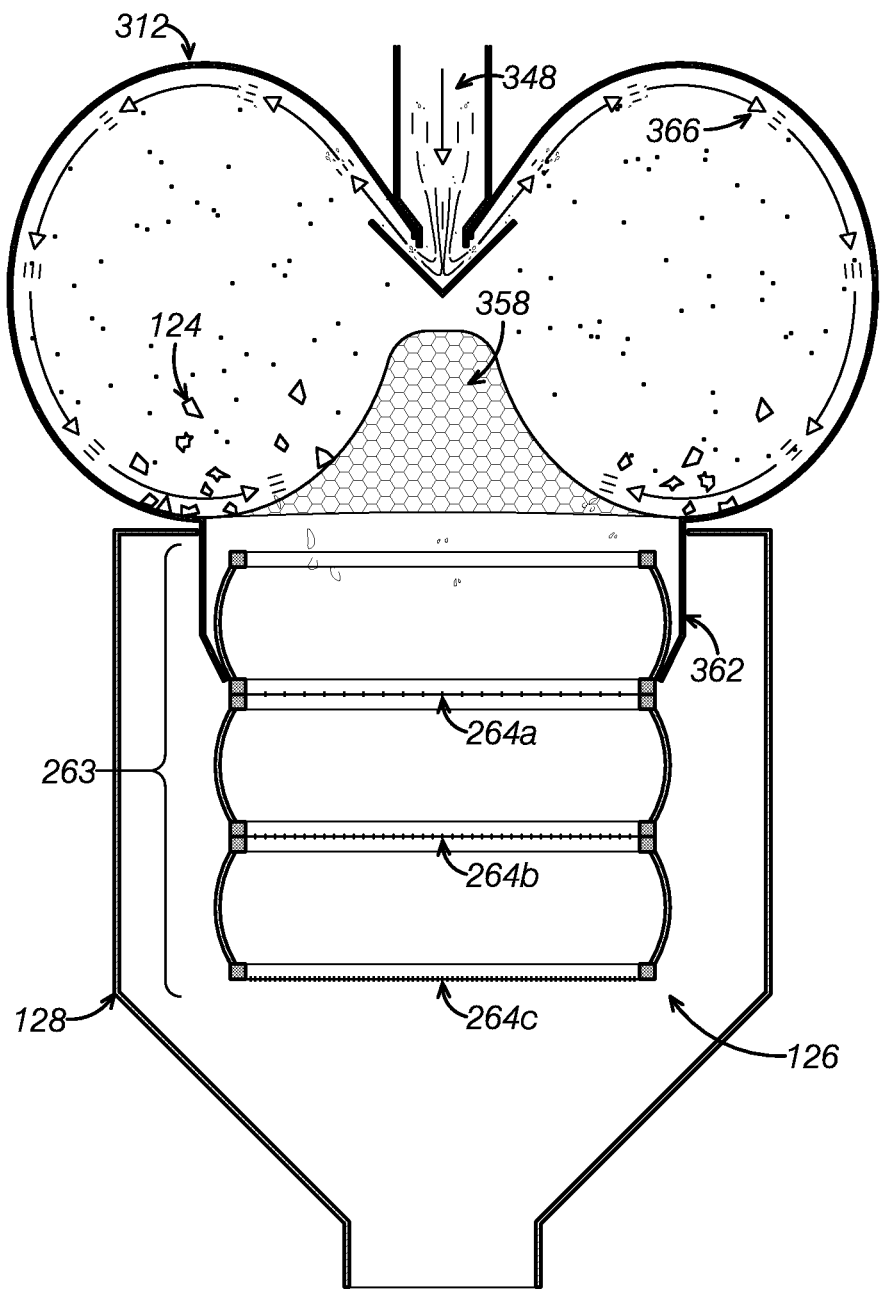
FIG. 3B illustrates a side exposed view of the toroidal washer and the second filter, according to an embodiment.

FIG. 3B illustrates a side exposed view of the toroidal washer 312 and the second filter 126, according to an embodiment. Some of the features in FIG. 3B are the same or similar to some of the features in FIGS. 1-3A as noted by same reference numbers, unless expressly described otherwise. As discussed above, the resin removal system 100 in FIG. 1 may include a washer 112 to remove resin from material 124. As further discussed, as the water and/or the air may circulate around the cavity of the toroidal washer 312 in the spherical or toroidal pattern, the water and/or the air may also chaotically or randomly move the material within the cavity of the toroidal washer 312 to dislodge or remove the resin from the material. As the water, the air, and the material circulate about the toroidal washer 312, the water, air, and material may be pulled toward an opening at the bottom of the toroidal washer 312 below the filter 358.

In one example, the processing tank 128 may be located approximate to the toroidal washer 312 to receive the water, the air, and resin from the material from the toroidal washer 312. In another example, the toroidal washer 312 may rest on top of the processing tank 128 with fasteners 362 that may extend from the bottom of the toroidal washer 312 to align the opening at the bottom of the toroidal washer 312 with an opening at the top of the second filter 126. In one example, the toroidal washer 312 and the second filter 126 may interlock or interconnect. In another example, the toroidal washer 312 may freely sit on top of the processing tank 128 with the opening at the bottom of the toroidal washer 312 being aligned with the opening at the top of the second filter 126 when the fasteners 362 of the toroidal washer 312 are inserted into the top of the processing tank 128.

When the toroidal washer 312 is connected or aligned with the second filter 126, the water, the air, and the resin may flow out of the opening at the bottom of the toroidal washer 312 and into the second filter 126. As the water, the air, and the resin flow through the second filter 126, the resin may be caught or trapped by the second filter 126 while the water and/or the air pass through the second filter 126 to be stored in the processing tank 128. As discussed above, the second filter 126 may include multiple sub-filters 264a-264c that may catch or trap different portions of the resin with different particulate sizes by having different mesh sizes or mesh numbers for the sub-filters.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A system, comprising:
   a water source coupled to a washer, wherein the water source comprises a first container to store water;
   an air source coupled to the washer, wherein the air source comprises:
      a second container to store cold material; and
      a coil at least partially enclosed by the second container, wherein:
         the coil includes a first end to intake air into the coil; and
         the cold material cools the coil;
   the washer configured to receive the water from the water source and the air from the air source into an interior cavity of the washer via an inlet, the washer including a first filter located within the interior cavity, wherein:
the interior cavity is configured to store a material;
the interior cavity is configured to direct a flow of the water and the air in a defined pattern to remove a resin from the material; and
the washer comprises an opening covered by the first filter, wherein the first filter is configured to allow the water, the air, and the resin to exit the opening while restricting the material from exiting the opening;
a first tank approximate the opening of the washer, the first tank including a tower structure located within the interior cavity of the first tank, wherein:
the first tank is configured to receive the water, the air, and the resin via a first opening in the first tank as the water, the air, and the resin exiting the opening of the washer; and
the tower structure comprises a first sub-filter to trap at least a first portion of the resin as the water, the air, and the resin enter the first tank via the first opening in the first tank;
a second filter coupled to a second opening of the first tank, wherein the second filter is configured to clean the water; and
a second tank coupled to the second filter, wherein the second tank is configured to store the water cleaned by the second filter.

2. The system of claim 1, wherein the second tank is coupled to the water source to provide the water to the water source.

3. The system of claim 2, wherein the water source, the washer, the first tank, and the second tank form a closed water system to recycle the water to remove the resin from the material.

4. The system of claim 1, wherein the water source is coupled to the washer by a first conduit and the air source is coupled to the washer by a second conduit.

5. The system of claim 1, wherein the water source is coupled to the washer by a first conduit and the air source is coupled to the first conduit by a second conduit.

6. The system of claim 5, wherein the second conduit is coupled to the first conduit by a venturi valve such that the flow of the water through the first conduit creates a natural pump to suck the air from the air source into the first conduit and mix the air with the water.

7. The system of claim 5, further comprising a sprayer coupled to the first conduit, wherein:
the sprayer is configured to receive at least a portion of the water from the first conduit; and
the sprayer is configured to spray the water to clean at least a portion of the system.

8. The system of claim 1, wherein the tower structure comprises a second sub-filter, wherein the first sub-filter is configured to trap a first portion of the resin and the second sub-filter is configured to trap a second portion of the resin, wherein the first portion of the resin comprises first resin particulates that are a first size and the second portion of the resin comprises second resin particulates that are a second size.

9. The system of claim 8, wherein the first resin particulates are a first grade of resin material and the second resin particulates are a second grade of resin material.

10. The system of claim 1, wherein the interior cavity of the washer is a torus shape to direct the flow of the air and the water in a centrifugal pattern.

11. The system of claim 1, wherein the interior cavity of the washer is a toroidal shape to direct the flow of the air and the water in a toroidal pattern.

12. The system of claim 1, wherein the coil cools the air below a threshold temperature.

13. The system of claim 1, wherein the coil heats the air above a threshold temperature.

14. An apparatus, comprising:
a water source coupled to a washer, wherein the water source comprises a first container to store water;
an air source coupled to the washer, wherein the air source comprises:
a second container to store cold material; and
a coil at least partially enclosed by the second container, wherein:
the coil includes a first end to intake air into the coil; and
the cold material cools the air within the coil; and
the washer is configured to receive the water from the water source and the air from the air source into an interior cavity of the washer via an inlet, the washer including a first filter located within the interior cavity, wherein:
the interior cavity is configured to store a material;
the interior cavity is configured to direct a flow of the water and the air in a defined pattern to remove a resin from the material; and
the washer comprises an opening covered by the first filter, wherein the first filter is configured to allow the water, the air, and the resin to exit the opening while restricting the material from exiting the opening.

15. The apparatus of claim 14, further comprising:
a first tank approximate the opening of the washer, the first tank including a tower structure located within the interior cavity of the first tank, wherein:
the first tank is configured to receive the water, the air, and the resin via a first opening in the first tank as the water, the air, and the resin exit the opening of the washer; and
the tower structure comprises a first sub-filter to trap at least a first portion of the resin as the water, the air, and the resin enter the first tank via the first opening in the first tank.

16. The apparatus of claim 14, wherein the interior cavity of the washer is a torus shape or a toroidal shape to direct the flow of the air and the water in a centrifugal pattern or a toroidal pattern.

17. A device, comprising:
a washer configured to receive water from a water source and air from an air source into an interior cavity of the washer via an inlet, the washer including a first filter located within the interior cavity, wherein:
the interior cavity is configured to store a material;
the interior cavity is configured to direct a flow of the water and the air in a defined pattern to remove a resin from the material; and
the washer comprises an opening covered by the first filter, wherein the first filter is configured to allow the water, the air, and the resin to exit the opening while restricting the material from exiting the opening; and
a first tank approximate the opening of the washer, the first tank including a tower structure located within the interior cavity of the first tank, wherein:

the first tank is configured to receive the water, the air, and the resin via a first opening in the first tank as the water, the air, and the resin exit the opening of the washer; and the tower structure comprises a first sub-filter to trap at least a first portion of the resin as the water, the air, and the resin enter the first tank via the first opening in the first tank.

18. The device of claim 17, further comprising the water source being coupled to the washer, the water source comprising a container to store water.

19. The device of claim 17, further comprising the air source being coupled to the washer, the air source comprising a coil that includes a first end to intake air into the coil, wherein the coil is configured to increase or decrease a temperature of the air to a defined temperature.

20. The device of claim 17, wherein:

the interior cavity of the washer is a torus shape or a toroidal shape to direct the flow of the air and the water in a centrifugal pattern or a toroidal pattern; and the centrifugal pattern or toroidal pattern generates a chaotic movement in the washer to remove the resin from the material.

\* \* \* \* \*